United States Patent
Lin et al.

(10) Patent No.: US 6,841,179 B2
(45) Date of Patent: Jan. 11, 2005

(54) PET FOOD COMPOSITIONS COMPRISING ELECTROSTATICALLY CHARGED GELATIN

(75) Inventors: Charles Lin, Decatur, AL (US); Jay Dahlgren, Madison, AL (US); Scott Morris, Chatham, NJ (US); Richard Thompson, New York, NY (US)

(73) Assignee: The Meow Mix Company, Secaucus, NJ (US)

( * ) Notice: Subject to any disclaimer, the term of this patent is extended or adjusted under 35 U.S.C. 154(b) by 153 days.

(21) Appl. No.: 10/294,374

(22) Filed: Nov. 14, 2002

(65) Prior Publication Data

US 2004/0096480 A1 May 20, 2004

(51) Int. Cl.$^7$ ................................................. A23K 1/00
(52) U.S. Cl. ............................ 426/2; 426/53; 426/601; 426/656; 426/658; 426/805
(58) Field of Search ............................ 426/2, 53, 601, 426/656, 658, 805

(56) References Cited

U.S. PATENT DOCUMENTS

| | | | |
|---|---|---|---|
| 3,862,336 A | | 1/1975 | Kofsky et al. .................. 426/1 |
| 4,393,085 A | * | 7/1983 | Spradlin et al. ............... 426/28 |
| 4,418,086 A | * | 11/1983 | Marino et al. ............... 426/302 |
| 4,713,250 A | * | 12/1987 | Tonyes et al. .................. 426/2 |
| 4,804,549 A | * | 2/1989 | Howley et al. ................ 426/98 |
| 5,595,761 A | | 1/1997 | Allen, Jr. et al. ........... 424/484 |
| 5,709,894 A | * | 1/1998 | Julien .......................... 426/53 |
| 5,932,245 A | | 8/1999 | Wunderlich et al. ......... 424/451 |
| 6,066,332 A | | 5/2000 | Wunderlich et al. ......... 424/464 |
| 6,080,403 A | | 6/2000 | Shields, Jr. et al. ...... 424/64.95 |
| 6,221,380 B1 | | 4/2001 | Woodroofe et al. .......... 424/438 |
| 6,383,529 B2 | | 5/2002 | Davenport et al. .......... 424/773 |
| 6,455,083 B1 | | 9/2002 | Wang ......................... 426/104 |

* cited by examiner

*Primary Examiner*—C. Sayala
(74) *Attorney, Agent, or Firm*—Hovey Williams LLP

(57) ABSTRACT

Animal feed compositions comprising amounts of protein, carbohydrate, fat and a functional ingredient for preventing hairball formation are provided. The functional ingredient comprises at least one member selected from the group consisting of electrostatically charged gelatin, animal bile acid, fungal acid protease, papain, and mixtures thereof.

20 Claims, No Drawings

PET FOOD COMPOSITIONS COMPRISING ELECTROSTATICALLY CHARGED GELATIN

BACKGROUND OF THE INVENTION

1. Field of the Invention

The present invention pertains to animal feed compositions which prevent hairball formation. Generally the compositions comprise respective amounts of protein, carbohydrate and fat, and are intended to constitute the primary diet for the animal. The compositions also comprise one or more ingredients specifically targeted at preventing hairball formation.

2. Description of the Prior Art

Hairball formation is a common physiological problem affecting animals which spend significant amounts of time grooming themselves, consequently ingesting their own hair. Cats are especially susceptible to hairball formation given that self-grooming occupies nearly one-third of their waking hours. Hair which is ingested and does not immediately pass through the cat's digestive track may accumulate in the stomach. After eating a meal and drinking a small portion of water, it is common for the cat to lay down and sleep. These factors taken together create ideal conditions for hairball formation. The hair, food particles, mineral salts, and the cat's own digestive mucus entangle to form a hairball. Hairball formation often leads to vomiting and diarrhea in the animal.

A number of pet food products are available which are directed toward alleviating this problem in animals, especially cats. Fiber-based products utilize cellulose, particularly from wood fiber or beet pulp, as functional ingredients to assist in removal of accumulated hair in the animal's stomach. Oil-based products use mineral oils as lubricating agents for removal of hair from inside the animal's stomach. However, cellulose and mineral oil are not natural components in the diet of cats and can decrease the product's palatability. In order to increase the palatability of these products, flavor enhancers are often added to the products thereby increasing the food's production cost. Fiber and oil-based products also disadvantageously increase the passage of food materials through the animal's digestive tract thereby reducing nutrient digestion and absorption.

U.S. Pat. No. 6,080,403 discloses another proposed method of preventing animal hairball formation. The '403 patent describes a pet food product including the enzyme bromelain, commonly found in pineapple juice. However, bromelain is not suitable for use in moist or canned pet food products due to its instability at temperatures which exceed 170° C.

Therefore, there is a real and unfulfilled need in the art for a pet food composition for preventing hairball formation which comprises a functional ingredient which is a natural part of the animal's diet and which does not detract from the food's nutritional value by interfering with the absorption and digestion of the food product. Furthermore, the functional ingredient should be capable of use in all types of animal feeds regardless of feed moisture content.

SUMMARY OF THE INVENTION

The present invention overcomes the above problems and provides animal feed compositions which prevent hairball formation. A preferred composition according to the invention comprises protein, carbohydrate, fat and electrostatically charged gelatin. Preferably the composition will comprise from about 0.1–30% by weight electrostatically charged gelatin, more preferably from about 1–10% by weight, and most preferably from about 5–8% by weight. All weight percentages expressed herein are based on the weight of the entire composition unless otherwise specified.

Gelatin is a transparent, brittle, essentially odorless and tasteless powder. Gelatin is a composition which is comprised of a plurality of different amino acids and is typically extracted from by-products of the meat industry including pork skin, tendons, ligaments, and bones. The imposition of an electrostatic charge on to the gelatin involves either the addition or removal of electrons from various groups on at least one of the amino acids of which gelatin is comprised. If the gelatin is to have a negative electrostatic charge, an electron is added to the carboxyl group of an amino acid while the amino group remains neutral. If the gelatin is to have a positive electrostatic charge, an electron is removed from the amino group of the amino acid while the carboxyl group remains neutral. Preferably, the gelatin will have a negative electrostatic charge. The electrostatically charged gelatin is preferably formed according to a method described in Applicants' co-pending U.S. patent application Ser. No. 10/294,274, entitled Method of Producing Electrostatically Charged Gelatin, which is incorporated by reference herein.

Animal feed compositions according to the present invention may be in the form of dry, semi-dry or moist animal feeds. Preferred dry feeds are characterized by a moisture content of less than about 12% by weight, more preferably about 5–10% by weight, and most preferably about 6.5–8.5% by weight. Semi-dry feeds preferably comprise from about 15–35% by weight moisture and more preferably from about 20–25% by weight. Moist or canned feeds preferably have a moisture content of at least 75% by weight and more preferably from about 70–75% by weight. Dry and semi-dry feeds and are preferably formed into self-sustaining extruded bodies presenting outer surfaces by extrusion processing. In preferred embodiments, the composition will comprise a coating which is applied to the outer surface of the body. Preferably, the coating will comprise a quantity of electrostatically charged gelatin, more preferably from about 0.1–10% by weight electrostatically charged gelatin, and most preferably from about 0.5–1.0% by weight, based on the weight of the entire coated composition.

Preferred compositions also comprise at least one additional component selected from the group consisting of animal bile acid, fungal acid protease, papain, and mixtures thereof. Fungal acid protease and papain are useful compounds in breaking up the mucus component of hairballs, while animal bile acid is useful in dissolving mineral salts which may also be present in hairballs. The additional component or components are preferably applied as part of the coating and in an amount of from about 0.001–5% by weight and preferably from about 0.5–1.0% by weight, based on the weight of the entire composition. However, it is possible for these components to be internally incorporated within the food product, especially in moist feed applications.

Compositions according to the present invention comprise from about 20–35% by weight protein, more preferably from about 25–35% by weight, and most preferably from about 30–33% by weight. Preferred dry animal feeds comprise from about 25–35% protein, and preferred semi-dry feeds comprise from about 30–35% by weight protein. Both plant and animal protein sources may be used to supply the required amount of protein. Exemplary animal protein sources include casein, albumin, whey, egg, fresh meat tissue, fresh fish tissue, dried or rendered meals such as fish meal, poultry meal, and bone meal. Exemplary plant protein sources include soybeans, cotton seeds, peanuts, corn gluten meal and wheat gluten meal. Microbial proteins such as yeast, fungus and bacteria are also useful protein sources.

Compositions according to the present invention also comprise from about 20–55% by eight carbohydrate, more preferably from about 25–35% by weight, and most preferably from bout 33–35% by weight. Preferred dry animal feeds comprise from about 20–25% carbohydrate, nd preferred semidry feeds comprise from about 35–50% by weight carbohydrate. The carbohydrate is preferably provided by a farinaceous material having a protein content of less than about 15% by weight. Grains such as corn, milo, alfalfa, wheat, barley, and rice and potatoes are preferred sources of carbohydrate, as well as corn syrup, sugar, and molasses.

Compositions according to the present invention further comprise from about 1–20% by weight fat, more preferably from about 3–15% by weight, and most preferably from about 9–10% by weight. Preferred dry animal feed compositions comprise from about 3–15% by weight fat, and preferred semi-dry feeds comprise from about 10–15% by weight fat. The fat may be supplied from either plant or animal sources, and preferably, combinations of both. Exemplary animal fat sources are the fat tissues of cattle, pigs, lambs, goats, turkeys, chicken, geese, ducks and fish. Exemplary plant fat sources include soybean oil, cottonseed oil, and olive oil.

Animal feed compositions according to the invention optionally comprise quantities of ash and fiber. Preferably, the feeds comprise from about 5–13% by weight ash, and more preferably from about 6–8% by weight. Preferably, the feeds comprise from about 1–13% by weight fiber, and more preferably from about 5–7.5% by weight. Preferred fiber sources include cellulose, semi-cellulose, corn cobs, soy hulls, peanut hulls, rice hulls, and yeast cell walls.

Preferred compositions according to the invention comprise at least one vitamin or mineral selected from the group consisting of calcium carbonate, potassium chloride, sodium chloride, taurine, zinc oxide, ferrous sulfate, vitamin E, vitamin A, vitamin B12, vitamin D3, vitamin K, riboflavin, niacin, calcium pantothenate, biotin, thiamine mononitrate, copper sulfate, folic acid, pyroxidine hydrochloride and calcium iodate. The vitamins and minerals are added in amounts according to American Association of Feed Control Officials (AAFCO) Cat Food Nutrient profiles.

It is within the scope of the present invention to provide methods for preventing hairball formation in an animal. Generally, methods according to the invention comprise the steps of providing a composition in accordance with the invention as described above and feeding the composition to an animal, preferably a cat. In a preferred embodiment, the method comprises providing a composition including protein, carbohydrate, fat and electrostatically charged gelatin. In another preferred embodiment, the method comprises providing a composition including protein, carbohydrate, fat, and at least one additional component selected from the group consisting of animal bile acid, fungal acid protease, papain, and mixtures thereof.

DETAILED DESCRIPTION OF THE PREFERRED EMBODIMENT

Pet food compositions according to the present invention generally comprise amounts of protein, carbohydrate, fat, and a hairball preventative ingredient. The hairball preventative ingredient is preferably selected from the group consisting of electrostatically charged gelatin, fungal acid protease, papain, animal bile acid, and mixtures thereof. The pet food compositions can have varying moisture contents. Exemplary dry, semi-dry, and moist compositions are set forth in Table 1.

TABLE 1

| Ingredient | Dry feeds Amount (wt. %) | Semi-dry feeds Amount (wt. %) | Moist feeds Amount (wt. %) |
| --- | --- | --- | --- |
| Yellow corn | 20.0–30.0 | 25.0–45.0 | 15.0–20.0 |
| Poultry meal | 25.0–35.0 | 20.0–25.0 | 5.0–10.0 |
| Corn gluten meal | 10.0–25.0 | 15.0–20.0 | 1.0–5.0 |
| Fish meal | 1.0–6.0 | 1.0–3.5 | 2.0–5.0 |
| Soybean meal | 5.0–15.0 | 1.0–5.0 | 1.0–5.0 |
| Fresh fish tissue | 5.0–15.0 | 5.0–20.0 | 15.0–25.0 |
| Fresh poultry tissue | 15.0–25.0 | 5.0–15.0 | 10.0–15.0 |
| High fructose corn syrup | 1.0–5.0 | 15.0–20.0 | — |
| Dry molasses | 1.0–5.0 | 0.5–1.5 | — |
| Phosphoric acid | 1.0–2.0 | 1.0–1.5 | — |
| Citric acid | 0.5–2.0 | 0.1–0.15 | — |
| Vitamin mix | 0.5–2.0 | 0.25–0.5 | 0.2–0.5 |
| Gelatin, (−) charged | 0.1–10.0 | 5.0–10.0 | 5.0–45.0 |
| Glycerine | — | 10.0–15.0 | — |
| Potassium sorbate | — | 0.2–0.3 | — |
| Animal bile acid | — | — | 0.001–0.002 |
| Water (added) | — | — | 45.0–55.0 |
| Animal fat | 6.0–10.0 | 6.0–10.0 | — |

Table 2 is intended to summarize additional preferred compositions which are within the scope of the invention. The amounts of each ingredient are given in terms of both broad and preferred ranges. The gelatin for use in the exemplary compositions of Table 2 may comprise gelatin having either a positive or negative electrostatic charge.

TABLE 2

| Ingredient | Broad Range (wt. %) | Preferred Range (wt. %) |
| --- | --- | --- |
| Poultry meal | 15.00–30.00 | 23.00–24.00 |
| Brewers rice | 10.00–30.00 | 19.00–20.00 |
| Corn gluten meal | 10.00–25.00 | 17.00–18.00 |
| Yellow corn | 10.00–20.00 | 12.00–13.00 |
| Cellulose | 1.00–15.00 | 5.00–6.00 |
| Gelatin (+) or (−) | 1.00–10.00 | 4.00–5.00 |
| Edible tallow | 1.00–15.00 | 5.00–6.00 |
| Fish meal | 1.00–6.00 | 3.00–5.00 |
| Chicken liver powder | 1.00–5.00 | 2.00–2.50 |
| Soybean oil | 1.00–5.00 | 1.50–2.00 |
| Mineral premix | 0.10–0.65 | 0.20–0.35 |
| Choline chloride (dry) | 0.20–0.40 | 0.30–0.40 |
| Brewers yeast | 0.10–1.50 | 0.20–0.25 |
| Salt | 0.10–0.55 | 0.10–0.15 |
| Taurine | 0.01–0.15 | 0.05–0.08 |
| Vitamin premix | 0.05–0.15 | 0.05–0.07 |

EXAMPLES

The following examples describe preferred compositions produced in accordance with the present invention. It is to be understood that these examples are provided by way of illustration and nothing therein should be taken as a limitation on the overall scope of the invention.

Example 1

This example describes a preferred dry cat food composition for preventing hairball formation produced in accordance with the invention. The composition is formulated mixing together the following ingredients:

TABLE 2

| Ingredient | Amount (wt. %) |
| --- | --- |
| Yellow corn | 30.00 |
| Poultry meal | 25.00 |
| Corn gluten meal | 17.50 |
| Fish meal | 1.65 |
| Soybean meal | 3.05 |
| Fresh fish tissue | 1.65 |
| Fresh poultry tissue | 10.00 |
| High fructose corn syrup | 1.00 |
| Dry molasses | 1.00 |
| Phosphoric acid | 1.00 |
| Citric acid | 0.50 |
| Vitamin mix | 0.20 |
| Gelatin, (−) charged | 1.00 |
| Animal fat | 6.45 |

The mixture is then passed through a twin-screw extrusion apparatus and the extrudate cut into portions of appropriate size for consumption by a cat. The maximum temperature of the composition at any given point in the extruder is 230° F. thereby avoiding excessive expansion of the extrudate. The maximum pressure at any given point within the extruder is 250 psi. The cut extrudate is dried to a moisture content of 8.5% by weight. A coating comprising 1% by weight negatively charged gelatin, 0.2% by weight fungal acid protease, 0.15% by weight papain, and 0.001% by weight animal bile acid (all weight percentages based on the weight of the entire coated composition) is sprayed on to the dried extrudate. As used herein the term "vitamin mix" refers to a mixture of assorted vitamins and minerals set forth in the American Association of Feed Control Officials (AAFCO) Cat Food Nutrient profiles.

Example 2

This example describes a preferred semi-dry cat food composition for preventing hairball formation produced in accordance with the invention. The composition is formulated mixing together the following ingredients:

TABLE 3

| Ingredient | Amount (wt. %) |
| --- | --- |
| Yellow corn | 30.00 |
| Poultry meal | 10.00 |
| Corn gluten meal | 10.00 |
| Fish meal | 1.00 |
| Soybean meal | 1.00 |
| Fresh fish tissue | 1.65 |
| Fresh poultry tissue | 5.00 |
| High fructose corn syrup | 15.00 |
| Dry molasses | 1.50 |
| Phosphoric acid | 1.50 |
| Citric acid | 0.10 |
| Vitamin mix | 0.25 |
| Gelatin, (−) charged | 10.00 |
| Glycerine | 10.00 |
| Potassium sorbate | 0.20 |
| Animal fat | 2.80 |

The mixture is then passed through a twin-screw extrusion apparatus and the extrudate cut into portions of appropriate size for consumption by a cat. The maximum temperature of the composition at any given point in the extruder is 245° F. The maximum pressure at any given point in the extruder is 250 psi. The cut extrudate is dried to a moisture content of 25% by weight. A coating comprising 1% by weight negatively charged gelatin, 0.25% by weight fungal acid protease, 0.15% by weight papain, and 0.002% by weight animal bile acid (all weight percentages based on the weight of the entire coated composition) is sprayed on to the dried extrudate.

Example 3

This example describes a preferred moist cat food composition for preventing hairball formation produced in accordance with the invention. The composition is formulated mixing together the following ingredients:

TABLE 4

| Ingredient | Amount (wt. %) |
| --- | --- |
| Yellow corn | 15.00 |
| Poultry meat | 5.00 |
| Corn gluten meal | 1.00 |
| Fish meal | 2.00 |
| Soybean meal | 1.00 |
| Fresh fish tissue | 15.00 |
| Fresh poultry tissue | 10.00 |
| Water | 45.00 |
| Vitamin mix | 0.20 |
| Gelatin, (−) charged | 5.00 |
| Animal bile acid | 0.001 |

The fresh tissues are frozen and ground through a ⅛ in. die plate and mixed with water at 70° F. The remaining dry ingredients are mixed in and the resulting slurry is precooked to a maximum temperature of 145° F. before canning. The mixture is placed in cans which are then retorted at 250–260° F. for about 50–52 minutes using 15 psi steam.

We claim:

1. An animal feed composition comprising protein, carbohydrate, fat, and electrostatically charged gelatin.

2. The composition of claim 1, said gelatin having a negative electrostatic charge.

3. The composition of claim 1, said composition comprising from about 0.1–10% by weight electrostatically charged gelatin.

4. The composition of claim 1, said composition being in the form of a self-sustaining extruded body presenting an outer surface.

5. The composition of claim 4, said outer surface being at least partially coated with said electrostatically charged gelatin.

6. The composition of claim 1, said composition comprising a coating, wherein said coating comprises from about 0.1–10% by weight electrostatically charged gelatin based on the weight of the entire coated composition.

7. The composition of claim 1, said composition comprising at least one additional component selected from the group consisting of animal bile acid, fungal acid protease, papain, and mixtures thereof.

8. The composition of claim 7, said composition comprising from about 0.001–5% by weight of said additional component.

9. An animal feed composition comprising:

from about 20–35% by weight protein;

from about 20–55% by weight carbohydrate;

from about 1–20% by weight fat; and from about 0.145% by weight electrostatically charged gelatin.

10. The composition of claim 9, said composition comprising from about 25–35% by weight protein, from about 20–25% by weight carbohydrate, and from about 3–15% by weight fat.

11. The composition of claim 9, said gelatin having a negative electrostatic charge.

12. The composition of claim 9, said composition being in the form of a self-sustaining extruded body presenting an outer surface.

13. The composition of claim 12, said outer surface being at least partially coated with said electrostatically charged gelatin.

14. The composition of claim 9, said composition comprising at least one additional component selected from the group consisting of animal bile acid, fungal acid protease, papain, and mixtures thereof.

15. A method of feeding an animal comprising the steps of:

providing a composition comprising protein, carbohydrate, fat, and electrostatically charged gelatin; and feeding said composition to said animal.

16. The method of claim 15, said gelatin having a negative electrostatic charge.

17. The method of claim 15, said composition comprising from about 0.1–45% by weight electrostatically charged gelatin.

18. The method of claim 15, said composition further comprising at least one additional component selected from the group consisting of animal bile acid, fungal acid protease, papain, and mixtures thereof.

19. The method of claim 18, said composition comprising from about 0.001–5% of said additional component.

20. The method of claim 15, feeding said composition to a cat.

* * * * *